United States Patent [19]

Peterson et al.

[11] Patent Number: 5,758,317
[45] Date of Patent: May 26, 1998

[54] METHOD FOR VOICE-BASED AFFILIATION OF AN OPERATOR IDENTIFICATION CODE TO A COMMUNICATION UNIT

[75] Inventors: Larry Michael Peterson; Anne Marie Johlie, both of Palatine, Ill.

[73] Assignee: Motorola, Inc., Schaumburg, Ill.

[21] Appl. No.: 684,724

[22] Filed: Jul. 22, 1996

Related U.S. Application Data

[63] Continuation of Ser. No. 130,827, Oct. 4, 1993, abandoned.

[51] Int. Cl.$^6$ .................................................... G10L 7/08
[52] U.S. Cl. ................................................ 704/247; 704/273
[58] Field of Search .............................. 395/2.4, 2.82, 395/2.83, 2.79, 2.61, 2.56; 455/34.1, 31.1, 54.1; 397/907; 704/247, 231, 273, 270, 274

[56] References Cited

U.S. PATENT DOCUMENTS

| | | | |
|---|---|---|---|
| 3,673,331 | 6/1972 | Hair et al. | 395/2.82 |
| 4,534,056 | 8/1985 | Feilchenfeld et al. | 381/42 |
| 4,653,097 | 3/1987 | Watanabe et al. | 395/2.82 |
| 4,885,777 | 12/1989 | Takaragi | 380/30 |
| 4,961,229 | 10/1990 | Takahashi | 395/2.82 |
| 5,153,918 | 10/1992 | Tuai | 380/25 |
| 5,212,832 | 5/1993 | Ness-Cohn | 455/54.1 |
| 5,235,598 | 8/1993 | Sasuta | 370/110.1 |
| 5,309,504 | 5/1994 | Morganstein | 379/67 |
| 5,430,827 | 7/1995 | Rissanen | 395/2.82 |

Primary Examiner—Allen R. MacDonald
Assistant Examiner—Richemond Dorvil
Attorney, Agent, or Firm—Christopher P. Moreno

[57] ABSTRACT

A method for voice-based affiliation of an operator identification code to a communication unit (101) is accomplished when the communication unit transmits a voice-based affiliation request, a predetermined voice pattern and a communication unit identification code, to a communication resource allocator (103). Upon reception of the voice-based affiliation request, the communication resource allocator compares stored predetermined voice patterns with the predetermined voice pattern to identify a matching predetermined voice pattern. When the matching predetermined voice pattern is identified, the communication resource allocator affiliates the operator identification code with the communication unit identification code, thus affiliating the operator identification code with the communication unit.

13 Claims, 4 Drawing Sheets

FIG. 4A

COMMUNICATION UNIT OPERATOR TABLE 400

| OPERATOR ID | OPERATOR ALIAS | OPERATOR CAPABILITY |
|---|---|---|
| 1 | ANNE | YNN |
| 2 | CHRIS | YYY |
| 3 | TIM | NYN |

FIG. 4B

COMMUNICATION UNIT TABLE 401

| COMMUNICATION UNIT ID | SERIAL NUMBER | COMMUNICATION UNIT CAPABILITY |
|---|---|---|
| 700001 | AZ2631 | YYY |
| 700002 | 9C762B | NYY |
| 700003 | AB9376 | NYY |

FIG. 4C

VOICE REGISTRATION LIST 402

| OPERATOR ID | VOICE PATTERN |
|---|---|
| 1 | DIGITIZED VOICE FOR ANNE |
| 2 | DIGITIZED VOICE FOR CHRIS |
| 3 | DIGITIZED VOICE FOR TIM |

FIG. 4D

VOICE REGISTRATION TABLE 403

| COMMUNICATION UNIT ID | OPERATOR ID | OPERATOR ALIAS | OPERATOR CAPABILITY |
|---|---|---|---|
| 700001 | 1 | ANNE | YNN |
| 700002 | 2 | CHRIS | NYY |
| 700003 | 3 | TIM | NYN |

METHOD FOR VOICE-BASED AFFILIATION OF AN OPERATOR IDENTIFICATION CODE TO A COMMUNICATION UNIT

This is a continuation of application Ser. No. 08/130,827, filed Oct. 04, 1993 and now abandoned.

FIELD OF THE INVENTION

The present invention relates generally to communication systems and, in particular, to a method for voice-based affiliation of an operator identification code to a communication unit.

BACKGROUND OF THE INVENTION

Communication systems are known to comprise a communication resource allocator, a plurality of communication units, such as in-car mobile or in-hand portable radios, and a limited number of communication resources transceived by the allocator and communication units. In managing such communication systems, it is often advantageous to separate the capabilities of each communication unit from the capabilities granted to specific operators and to create a database of operator identification code-to-communication unit affiliations within the allocator. Thus, operators may affiliate themselves with any communication unit within the system and still retain their original set of privileges, subject to the limitations of the communication unit.

For example, a communication unit may have the capability to perform telephone interconnect calls, but a given operator of the communication unit may not have such privileges. So long as the given operator remains affiliated with the communication unit, requests from this communication unit received by the allocator for telephone interconnect services are denied.

Currently, the only method for modifying operator identification code-to-communication unit affiliations is through a management terminal associated with the communication resource allocator. Typically, communication unit operators do not have convenient access to, or are not allowed to access, the management terminal. Thus, if an operator wishes to affiliate with a communication unit, they must first transmit a message to a system manager requesting the affiliation. The system manager, upon receipt of the request, manually enters the request in to the management terminal, thus updating the database and completing the affiliation. This can be a time consuming and cumbersome process, especially in systems containing a large number of communication units. Thus, communication units are affiliated with only one operator for extended periods of time. Consequently, a need exists for a method for affiliating an operator identification code to a communication unit which does not require manual entry of the affiliation through a management terminal.

BRIEF DESCRIPTION OF THE DRAWINGS

FIGS. 4A through 4D illustrates a working example of the present invention.

DESCRIPTION OF A PREFERRED EMBODIMENT

Generally, the present invention provides a method for voice-based affiliation of an operator identification code with a communication unit. This is accomplished by activating the communication unit or depressing a sign-on button. The communication unit receives a predetermined voice pattern, which is then transmitted, along with a voice-based affiliation request and a communication unit identification code, to a communication resource allocator. The communication resource allocator receives the affiliation request and compares the predetermined voice pattern with stored predetermined voice patterns. Upon finding a matching predetermined voice pattern, an operator identification code is determined based on the matching stored predetermined voice pattern. The operator identification code is then affiliated with the communication unit identification code. With such a method, operators of the communication unit, without the intervention of a system manager, can affiliate their operator identification codes with the communication unit.

Figure 1:
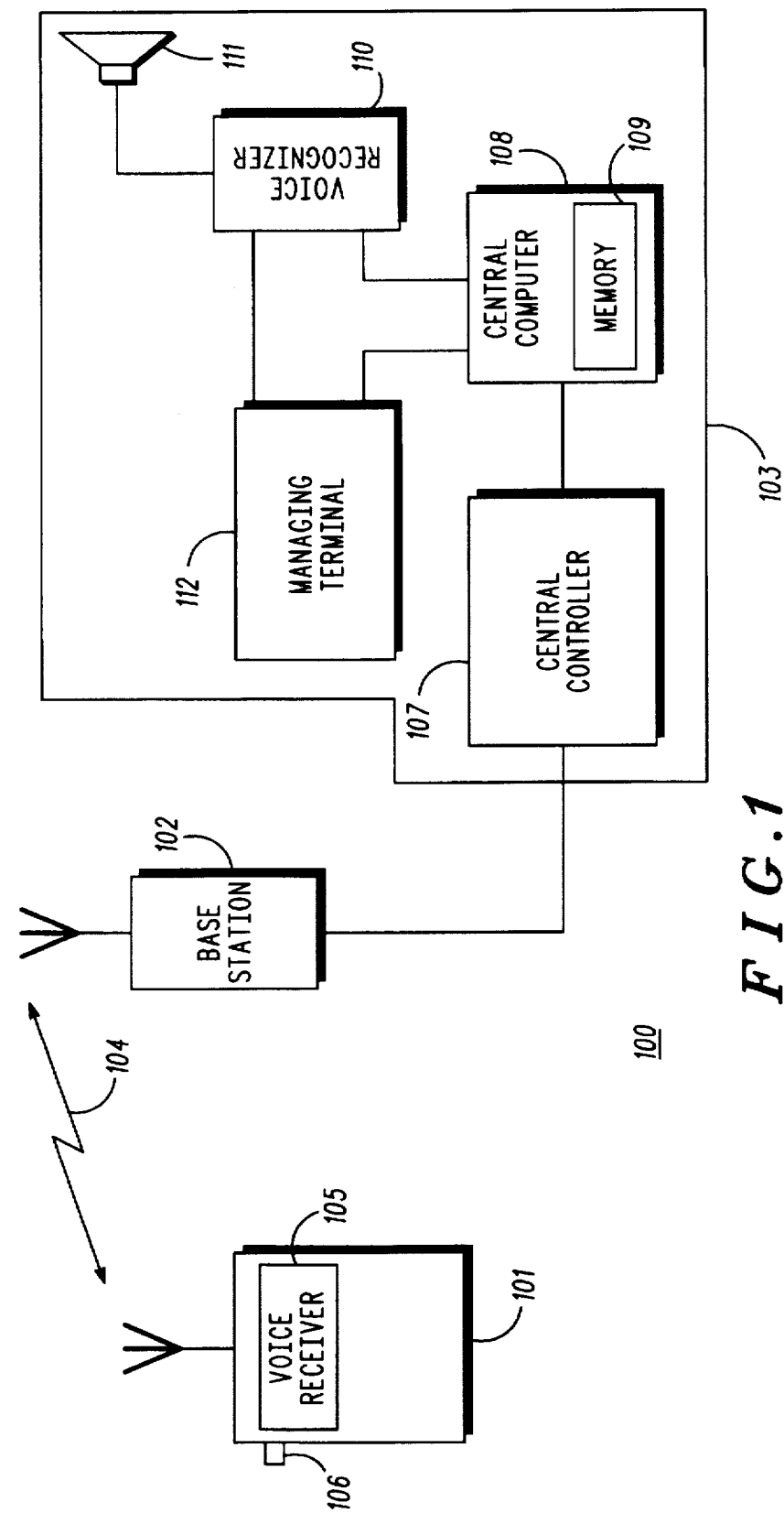
FIG. 1 illustrates a communication system including a communication unit and a communication resource allocator in accordance with the present invention.

The present invention can be more fully described with reference to FIGS. 1–4. FIG. 1 illustrates a wireless communication system (100) that includes a communication unit (101), a base station (102), a communication resource allocator (103), and a wireless communication resources (104). The communication unit (101) may be a hand-held portable radio, including a voice receiver (105) and a sign-on button (106). The voice receiver (105) is a device that can receive, digitize, and store a predetermined voice pattern. The sign-on button (106) causes the communication unit (101) to enter a sign-on mode and enables the communication unit (101) to receive voice, via the voice receiver (105), and transmit a voice-based affiliation request. Additionally, when the communication unit (101) is already in sign-on mode, the sign-on button (106) signals the communication unit (101) to send a deaffiliation request (deaffiliate communication unit from current operator identification code) and wait for a subsequent voice pattern for signing on to the central controller (107).

The base station (102) and the communication unit (101) transceive the wireless communication resources (104), where the communication resource (104) may be multiple RF (radio frequency) channels such as pairs of frequency carriers, time division multiplex (TDM) slots, or any other RF transmission media.

The communication resource allocator (103) includes a central controller (107), a central computer (108), memory (109), a voice recognizer (110), a microphone (111), and a managing terminal (112). The memory (109) is a database, such as an Interbase relational database, which stores operator identification codes and their associated stored predetermined voice patterns. The central computer (108), which may be an IMP XM computer, controls all operations affecting the memory (109). The voice recognizer (110) is a device that can receive and digitize voice for storage in the memory (109). Furthermore, the voice recognizer (110) compares predetermined voice patterns received from the communication unit (101) with stored predetermined voice patterns. In the event of a match, the voice recognizer (110) signals the central computer (108) and/or the managing terminal (112) of the match. Note that regardless of its syntactical contents, the predetermined voice pattern must be of sufficient duration to establish reliable voice recognition and must be short enough for convenient storage.

Implementation of the present invention most logically begins with the creation of the database (109) of stored predetermined voice patterns and their associated operator identification codes.

Figure 2:
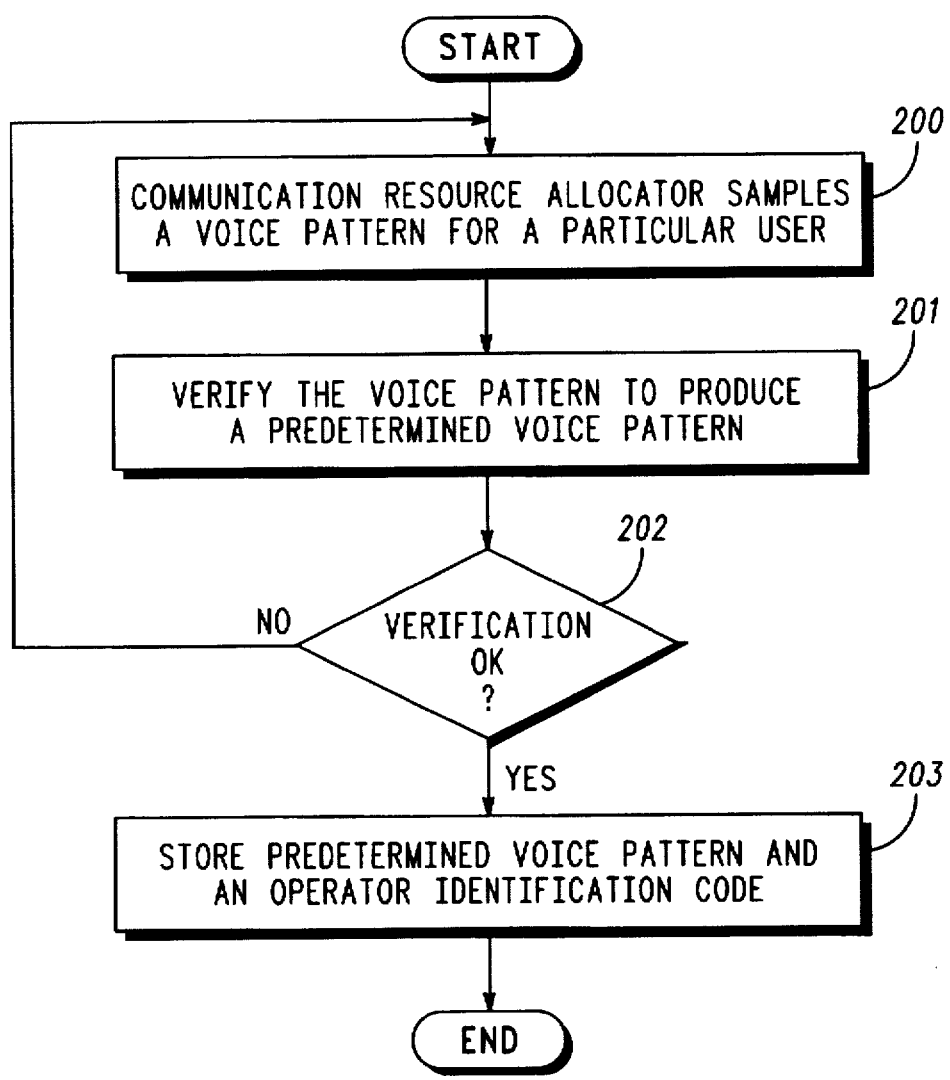
FIG. 2 illustrates a logic diagram which may be incorporated by a communication resource allocator to generate a database of predetermined voice patterns.
Figure 3:
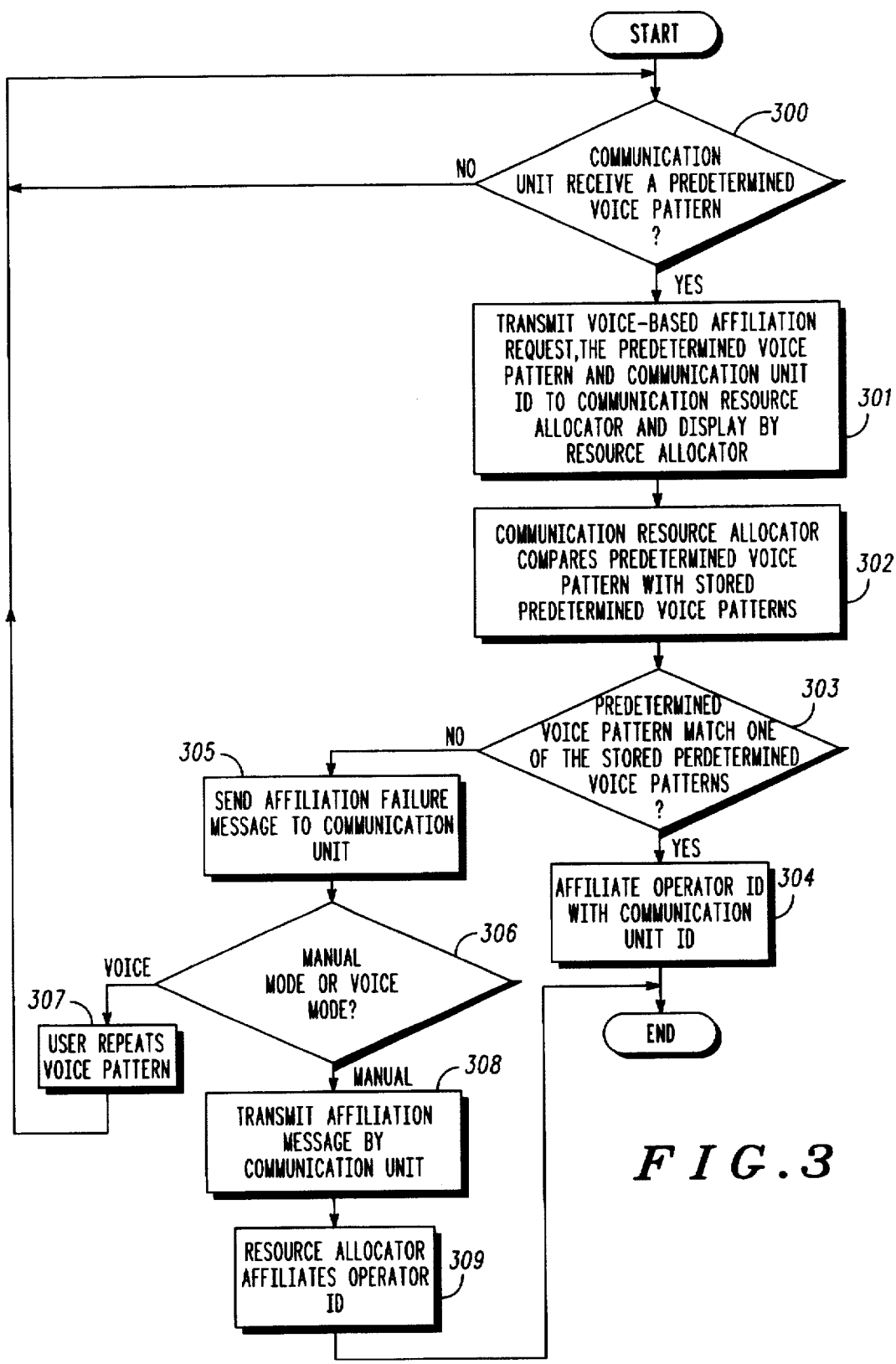
FIG. 3 illustrates a logic diagram which may be used to implement the present invention.

FIG. 2 illustrates a logic diagram that a communication resource allocator may incorporate to generate a database of stored predetermined voice patterns and their associated operator identification codes. At step 200, a particular user speaks into the microphone (111) stating a voice pattern, such as their full name, which is digitized by the voice recognizer (110) and stored in the database (109) by the central computer (108). The user repeats the voice pattern to ensure consistency with the first sample of voice (201), thereby producing a predetermined voice pattern. If the two voice patterns are inconsistent (202), the process may be repeated at step 200.

When the two voice patterns are consistent with each other (202), the predetermined voice pattern is stored in the database (109) along with the operator identification code of the user. This process can be repeated for each user in the communication system (100) to create the complete database (109). Having established a database of predetermined voice patterns and their corresponding operator identification codes, the database (109) may be used as described in FIG. 3.

At step 300, the communication unit (101) is either powered-up or the sign-on button (106) is pressed causing the unit (101) to wait for reception of the predetermined voice pattern from an operator of the unit (101). The communication unit (101) can detect the end of the predetermined voice pattern using voice detection algorithms or the operator can signal the end to the unit (101), for example via a series of button pushes. Regardless of the manner in which it is terminated, the predetermined voice pattern is digitized and stored by the voice receiver (105).

Once the predetermined voice pattern is received (300), a voice-based affiliation request, in the form of an inbound signal word (ISW), is transmitted (301) via the wireless communication resources (104) to the communication resource allocator (103) along with the digitized predetermined voice pattern and a communication unit identification code. Upon reception of the voice-based affiliation request, the resource allocator (103) displays (301), via a console associated with the allocator (103) (not shown), the voice-based affiliation request and the communication unit identification code, thereby notifying an operator of the console of the pending affiliation request.

The resource allocator (103) compares, via the voice recognizer (110), the received predetermined voice pattern with each of the stored predetermined voice patterns stored in the database (109). In this manner, the allocator (103) attempts to match, within a limited range of variance, the predetermined voice pattern with one of the stored predetermined voice patterns. The amount of variance allowed between voice patterns when attempting to find a match can be adjusted so as to minimize the number of false matches and undetected matches. When a matching predetermined voice pattern is found (303), an entry is made in the database (109) to affiliate (304) the operator identification code corresponding to the matching predetermined voice pattern with the communication unit identification code, thus affiliating the operator with the communication unit (101).

When a matching predetermined voice pattern is not found (303), the communication resource allocator (103) transmits, via the base station (102), an affiliation failure message (305), in the form of an outbound signalling word (OSW), to the communication unit (101). In a preferred embodiment, reception of the affiliation failure message causes the communication unit (101) to alert the operator, for example via audible beeps, that the voice-based affiliation request has failed. At this point, the operator can re-try the voice affiliation (306). To this end, the operator must press the sign-on button (106) again, thereby allowing the communication unit (101) to receive a second predetermined voice pattern, syntactically identical to the predetermined voice pattern (307), and the process continues at step 300.

Alternately, the operator may opt to attempt manual, or non-voice based, affiliation (306) and send an affiliation request only (308), in the form of an ISW, requesting that an operator of the console manually affiliate (309) the communication unit (101) with its operator in the database (109). In a preferred embodiment, the console operator may also choose to ignore the affiliation request, transmitting the affiliation failure message to the operator of the communication unit (101) instead.

A working example of the present invention is illustrated in FIGS. 4A through 4D. In this example, an Operator Table (400), a Communication Unit Table (401), a Voice Registration List (402), and a Voice Registration Table (403) are stored in the database (109). The Operator Table (400) is a static table, referenced by operator identification codes, containing the operator alias and operator capabilities for each operator ID. The Communication Unit Table (401) is a static table, referenced by communication unit identification codes, containing the serial number and unit capabilities for each communication unit ID. The information in these tables (400–401) is entered/updated by a communication system manager as needed. Note that the sets of operator capabilities and the sets of communication unit capabilities shown symbolically represent the differing capabilities of the respective operators and communication units. For example, according to the Operator Table (400), Chris is allowed to use all three services represented (YYY), whereas Tim is only allowed to use the second service (NYN).

Based on the information shown in these tables (400–401), the total capabilities of any operator in the system are defined. For example, assume Anne (operator ID=1) is affiliated with communication unit ID=700001, serial number AZ2631, communication unit capabilities YYY, and is authorized to utilize those communication services represented by YNN. Further assume that the capabilities YNN of Anne indicate that she is capable of interconnect calls. Additionally, the capabilities YYY of the communication unit allow for all services, including interconnect calls. Thus, when Anne is using the communication unit 700001, she is capable of performing interconnect calls. If either Anne or her default communication unit 700001 are not capable of interconnect calls, then she is unable to use this service.

The Voice Registration List (402) is created via the process described in FIG. 2, and contains the predetermined voice pattern associated with each operator identification code found in the system. Each time an operator is added or removed from the system, a corresponding entry, based on the operator ID, is added or deleted from the Voice Registration List (402).

The Voice Registration Table (403) is a dynamic table, referenced by communication unit identification codes, containing all the operator ID, operator alias, and overall operator capability for each active operator. Whenever an operator is affiliated with a communication unit, an entry is made in the Voice Registration Table (403). Conversely, when an operator deaffiliates from a communication unit, the corresponding entry in the Voice Registration Table (403) relating to that operator and communication unit is deleted. Furthermore, the operator capabilities in the Voice Registration Table (403) are the intersections of the relevant capability fields of the Operator Table (400) and the Communication Unit Table (401).

For example, if Chris transmits a voice-based affiliation request using the communication unit having identification code 700002, the received predetermined voice pattern is compared with each of the stored predetermined voice patterns found in the Voice Registration List (402). When the matching predetermined voice pattern is found, the corresponding operator ID for Chris (ID =2) is determined. Thus, an entry (424) is created for Chris in which the operator capabilities (NYY) is the intersection of the operator capabilities for Chris (YYY) and the respective communication unit capabilities (NYY). When Chris deaffiliates with this communication unit, the entry (424) is deleted from the Voice Registration Table (403).

The present invention provides a method for voice-based affiliation of a communication unit with an operator identification code. With such a method, users are able to quickly become active on a communication system without the need for manual affiliation by a dispatcher. In addition, whereas prior art solutions required users to be assigned to individual communications units for an extended period of time due to time-consuming affiliation procedures, the present invention allows users to share communication units more easily.

We claim:

1. In a wireless communication system that includes a communication resource allocator, a plurality of communication units, and wireless communication resources, a method for voice-based affiliation of an operator identification code to a communication unit of the plurality of communication units, the method comprises the steps of:

a) upon activation of the communication unit, receiving, by the communication unit, a predetermined voice pattern;

b) transmitting, by the communication unit via the wireless communication resources, a voice-based affiliation request along with the predetermined voice pattern and a communication unit identification code to the communication resource allocator;

c) receiving, by the communication resource allocator, the voice-based affiliation request, the predetermined voice pattern, and the communication unit identification code;

d) comparing, by the communication resource allocator, the predetermined voice pattern with stored predetermined voice patterns to identify a matching stored predetermined voice pattern;

e) when the matching stored predetermined voice pattern is identified, determining, by the communication resource allocator, the operator identification code based on the matching stored predetermined voice pattern; and f) affiliating, by the communication resource allocator, the operator identification code with the communication unit identification code, such that the operator identification code is affiliated with the communication unit.

2. The method of claim 1 further comprising steps of:

g) when the matching stored predetermined voice pattern is not identified, transmitting, by the communication resource allocator, an affiliation failure message to the communication unit; and h) when the communication unit receives the affiliation failure message, notifying, by the communication unit, an operator of the communication unit that the matching predetermined voice pattern was not identified.

3. The method of claim 2 further comprising steps of:

i) receiving, by the communication unit, a second predetermined voice pattern; and j) transmitting, by the communication unit, the voice-based affiliation request, the second predetermined voice pattern, and the communication unit identification code to the communication resource allocator.

4. The method of claim 2 further comprising steps of:

i) transmitting, by the communication unit, a non-voice based affiliation request.

5. The method of claim 1, step (a) further comprising a step of activating, by an operator of the communication unit, a sign-on button.

6. The method of claim 1, step (c) further comprising a step of displaying, on a console, the voice-based affiliation request and the communication unit identification code.

7. The method of claim 6, step (c) further comprising a step of, upon receiving the voice-based affiliation request, allowing an operator of the console to manually affiliate, via the communication resource allocator, the operator identification code with the communication unit identification code, such that the operator identification code is affiliated with the communication unit.

8. In a wireless communication system that includes a communication resource allocator, a plurality of communication units, and wireless communication resources, a method for generating a database of predetermined voice patterns and corresponding operator identification codes, the method comprises the steps of:

a) sampling, by the communication resource allocator, a voice pattern for a particular user;

b) verifying, by the communication resource allocator, the voice pattern to produce a predetermined voice pattern; and c) when the voice pattern is verified, storing, by the communication resource allocator, the predetermined voice pattern and an operator identification code of the particular user, wherein the operator identification code is affiliated with the predetermined voice pattern.

9. A method for a communication unit to request voice-based affiliation of an operator identification code, the method comprises the steps of:

a) upon activation of the communication unit, receiving, by the communication unit, a predetermined voice pattern; and b) transmitting, by the communication unit via a wireless communication resource, a voice-based affiliation request along with the predetermined voice pattern and a communication unit identification code to a communication resource allocator.

10. The method of claim 9 further comprising steps of:

c) receiving, by the communication unit, an affiliation failure message; and d) notifying, by the communication unit, an operator of the communication unit that a matching predetermined voice pattern was not identified.

11. The method of claim 10 further comprising steps of:

e) receiving, by the communication unit, a second predetermined voice pattern; and f) transmitting, by the communication unit, the voice-based affiliation request, the second predetermined voice pattern, and the communication unit identification code to the communication resource allocator.

12. The method of claim 10 further comprising steps of:

i) transmitting, by the communication unit, a non-voice based affiliation request.

13. The method of claim 9, step (a) further comprising a step of activating, by an operator of the communication unit, a sign-on button.

* * * * *